United States Patent [19]

Meister

[11] Patent Number: 4,861,412
[45] Date of Patent: Aug. 29, 1989

[54] LARGE AREA WELDING MACHINE FOR PLASTIC SHEETS

[75] Inventor: Anton Meister, Sarnen, Switzerland
[73] Assignee: Meistermatic AG, Switzerland
[21] Appl. No.: 155,297
[22] Filed: Feb. 12, 1988
[30] Foreign Application Priority Data
  Feb. 17, 1987 [CH] Switzerland .............. 00588/87
[51] Int. Cl.⁴ ............... B32B 31/08; B32B 31/20
[52] U.S. Cl. ............. 156/499; 156/574; 156/579
[58] Field of Search ........... 156/391, 574, 579, 555, 156/574, 579, 582, 583.5, 499, 71

[56] References Cited

U.S. PATENT DOCUMENTS

| | | | |
|---|---|---|---|
| 4,239,581 | 12/1980 | Lang | 156/579 |
| 4,602,978 | 7/1986 | Eckstein | 156/579 |
| 4,737,213 | 4/1988 | Paeglis | 156/499 |
| 4,744,855 | 5/1988 | Ellenberger | 156/579 |

Primary Examiner—George F. Lesmes
Assistant Examiner—J. Davis
Attorney, Agent, or Firm—Darby & Darby

[57] ABSTRACT

For the purpose of providing satisfactory, tight welding of overlapping sheet edges and also when passing over uneven surfaces, a press-on roller and two travel rollers are synchronously driven by a drive motor and toothed belt at a traveling, L-shaped machine frame. The travel rollers are laterally offset to the track of the press-on roller, whereby an oblique position of the press-on roller does not occur even in the case of relatively great sheet thicknesses. A heating nozzle running along in front of the press-on roller engages between the sheet edges and forms a pocket, for the lateral closure of which a hold-down is used. The hold-down has a press-on belt rotating in the travel direction and rolling off on the sheet edges, is mounted with vertical play on the frame, and is driven from the press-on roller.

4 Claims, 3 Drawing Sheets

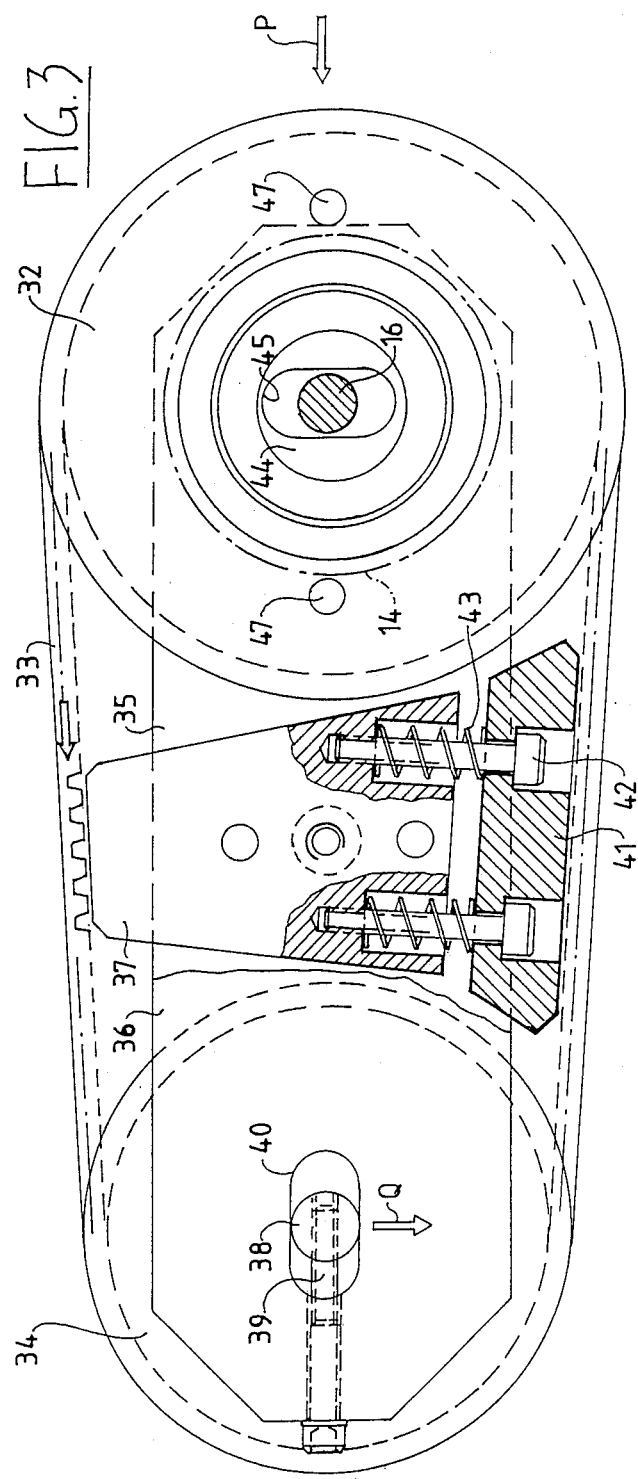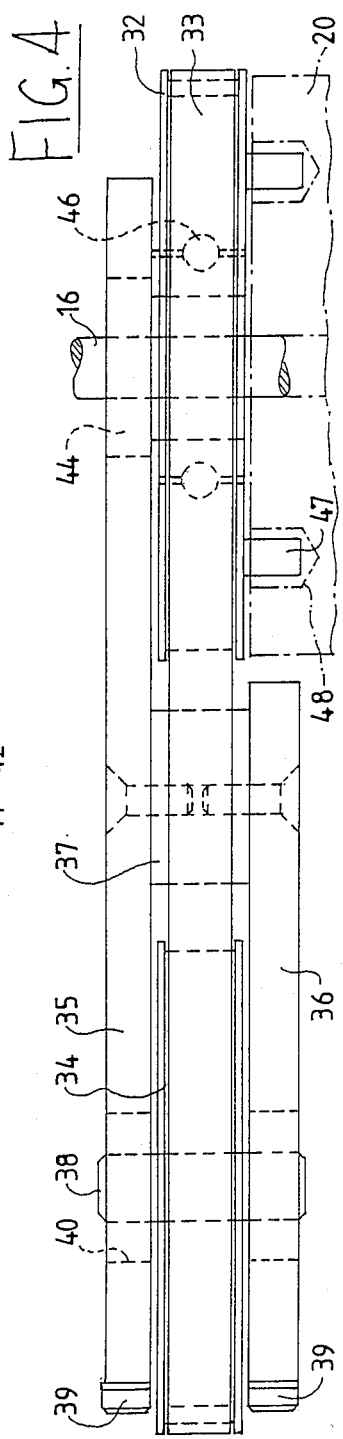

LARGE AREA WELDING MACHINE FOR PLASTIC SHEETS

FIELD OF THE INVENTION

The invention relates to a large-area welding machine for plastic sheets laid out with overlapping edges, having a machine frame wheelable on rollers in the direction of the sheet edges, a heating nozzle running along and engaging between the sheet edges in front of a press-on roller, as well as hold-down means disposed next to the heating nozzle and pressing the sheet edges together.

BACKGROUND OF THE PRIOR ART

With devices of the kind referred above, large-area sheet webs, as frequently used for insulation or for the sealing of roofs, floors or walls in buildings, can be welded together. In the weld area preceding the press-on roller, a "pocket" is formed by the heating nozzle between the overlapping sheet edges, hot air being blown into it to melt the sheet surface; this pocket is to be limited laterally by applied hold-down means and is to be closed. In known machines of this kind, difficulties arise, especially in the case of relatively thick sheets, because the press-on roll does not apply tightly for its entire width as a result of an oblique position of the machine frame. Furthermore, since driven as well as idle rollers are provided at the machine frame, upsetting and rippling often occurs during travel of the machine. In addition, the snug bearing contact of the machine and, in particular, the closure of the "pocket" is often interfered with by the hold-down means when traveling over uneven surfaces. Hence, reliable welding is not assured, and there is particular danger that if the "pocket" is not tightly closed on the side, hot air will be blown under one sheet web, which may thereby be lifted up.

SUMMARY OF THE INVENTION

It is an object of the invention to design a welding machine of the above-mentioned kind to insure reliable operation with satisfactory, perfectly tight welding and without upsetting or rippling of the sheets. According to the invention, this problem is solved by the fact that the press-on roller and two traveling rollers proceeding in the direction of travel are driven synchronously, the traveling rollers being mounted laterally offset to the track of the press-on roller, and that there exists a hold-down with a press-on belt rotating in the direction of travel and rolling along on the sheet edges. It is achieved thereby that, independently of the sheet thickness and also in the case of uneven surfaces, the press-on roller as well as the hold-down apply permanently and snugly and any displacement of the sheets in the plane thereof is prevented.

Further features and advantages of the invention are identified in the following description and claims. An embodiment of the welding machine according to the invention will be explained more specifically below in conjunction with the drawing.

BRIEF DESCRIPTION OF THE DRAWINGS

In the drawings:

FIG. 3 is a partially sectioned view of the hold-down in the direction of arrow III in FIG. 1; and FIG. 4 is a plan view of the hold-down according to FIG. 3.

DESCRIPTION OF THE PREFERRED EMBODIMENTS

Figure 1:
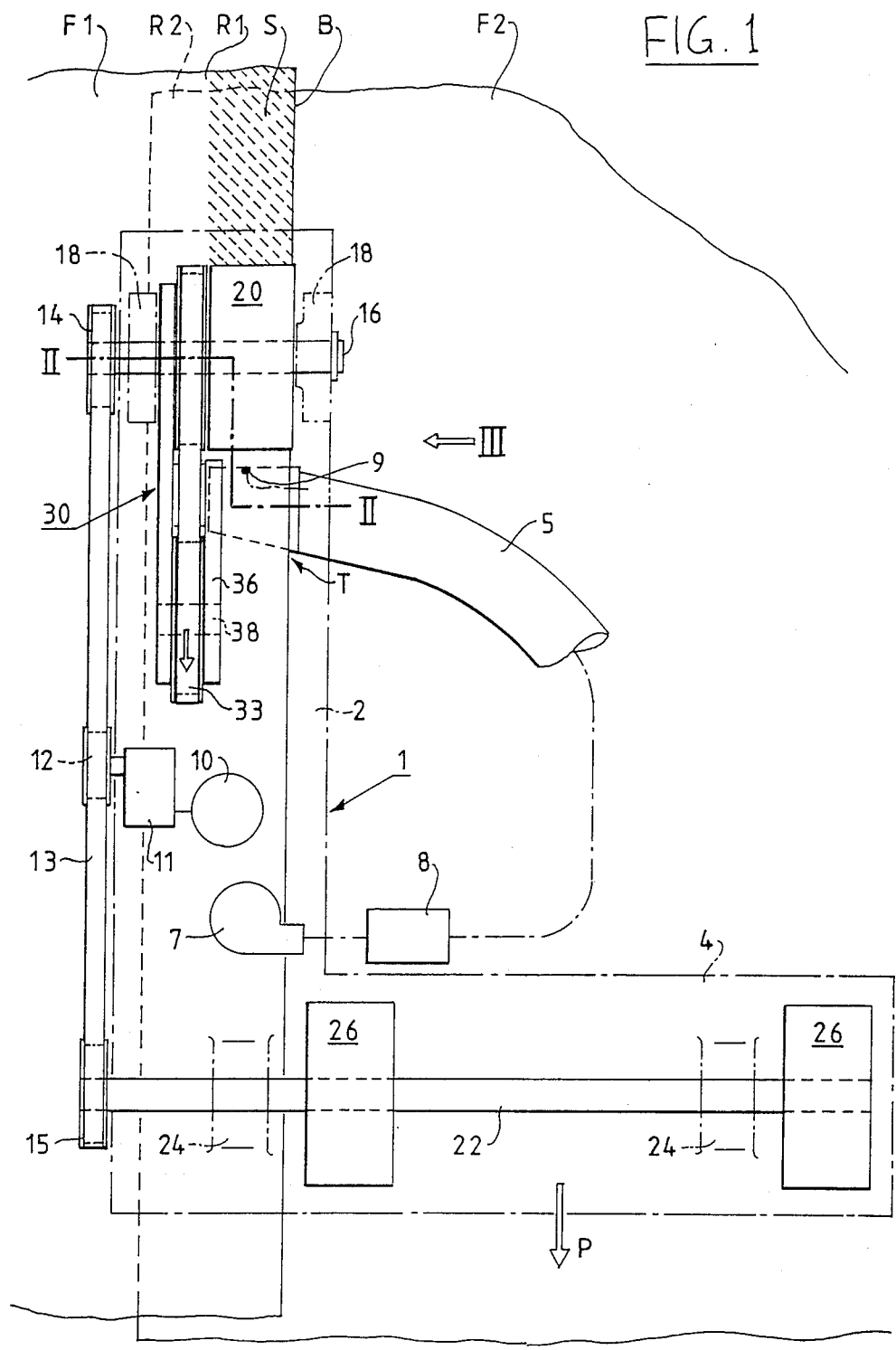
FIG. 1 is a top view of the machine, the machine frame being shown in dash-dot lines and various parts arranged thereon being indicated only schematically.
Figure 2:
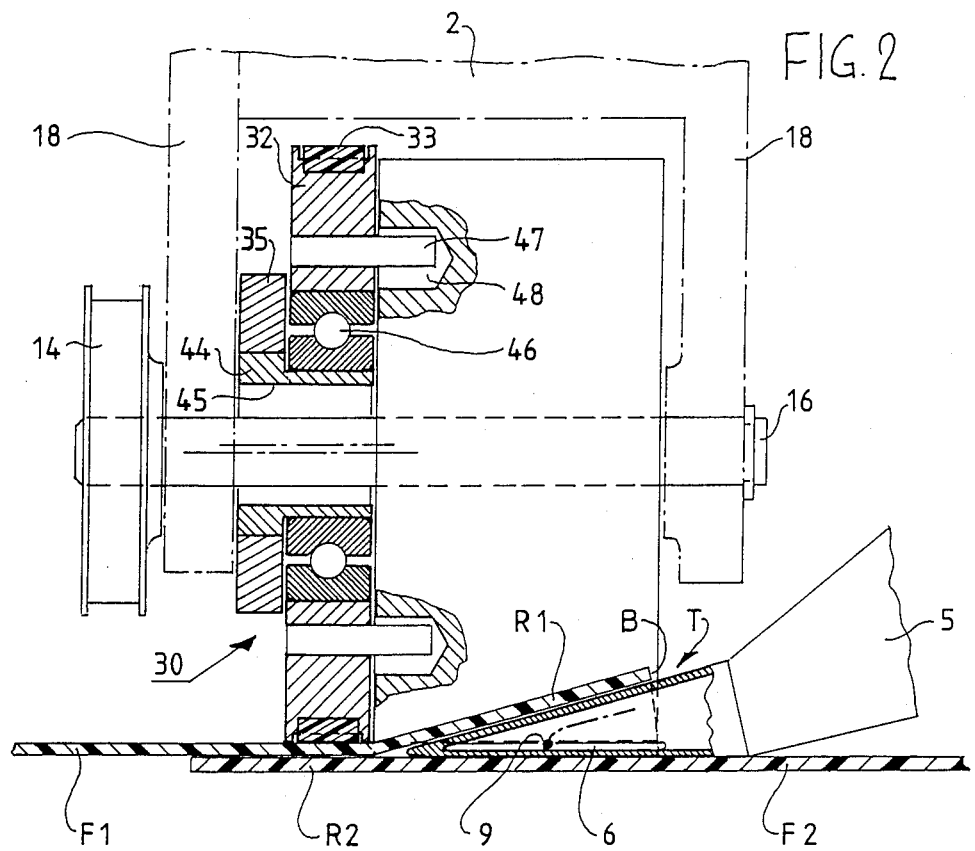
FIG. 2 is a vertical section along line II—II in FIG. 1.

In FIGS. 1 and 2 are shown the plastic sheets F1 and F2 spread out side by side, which are to be welded together along the overlapping edges R1 and R2 in a zone S by means of the welding machine according to FIG. 1. During welding, the machine runs in the direction of arrow P, i.e. parallel to the sheet edge B. The wheelable machine frame 1 is substantially L-shaped, i.e. it has a leg 2 extending in the direction of travel and a leg 4 at right angles thereto. On the underside of the machine frame 1, rollers 20, 26 are mounted as follows: A drive shaft 16 for the press-on roller 20 is supported in two bearings at the trailing end of leg 2, and at leg 4, parallel to shaft 16, there extends the drive shaft 22 supported in bearings 24, for two traveling rollers 26; the rollers 20, 26 are non-rotationally connected with their drive shafts 16 and 22, respectively. Mounted on shaft 16 is a toothed disk 14, and shaft 22 a toothed disk 15. Over both toothed disks 14 and 15 runs a toothed belt 13, and meshing with the latter is a gear 12 which is driven via a gear drive 11 by the travel motor 10 attached to the machine frame. Thus the press-on roller 20 and the two travel rollers 26 preceding in travel direction P are driven synchronously. The arrangement of the rollers is such that both travel rollers 26 are laterally offset to the track of the press-on roller 20, i.e. apply solely on sheet F2 next to the sheet edge B. This rules out an oblique position as a result of the sheet thickness, nor can the sheets be mutually upset in the travel direction.

In known manner, the welding machine is provided with a heating nozzle 5 which runs along. The latter is provided with hot air from a blower 7 secured on the machine frame, via a heating unit 8. The nozzle 5 is pivotably mounted (not shown) on the machine frame 1 and, in operation, engages between the sheet edges R1 and R2 before the press-on roller 20, whereby a pocket T is formed, into which the hot air is blown for melting the sheet surface. The main outlet opening of the nozzle is formed as a slit 6 which is directed against the press-on roller 20 (additional, small nozzle openings, not shown, may be provided for the purpose of air conduction, reduction of friction, etc.). In the region of the nozzle slit 6, a temperature sensor 9 is provided, which acts on the heating unit 8 via a regulator (not shown) for the purpose of stabilizing or controlling the heating temperature. The sheet regions fused in pocket T are thereafter run over by the press-on roller 20 and are pressed together, whereby the welded zone S is formed in the width of the press-on roller.

Laterally of the heating nozzle 5 is a hold-down 30 also running along in the travel direction P. It is important that the hold-down be so constituted that, by pressing together of the overlapping sheet edges, it properly closes the pocket T laterally, but without exerting any appreciable forces in the sheet plane during advance that could cause a displacement of the sheets. The construction, mounting and drive of the hold-down 30 are essentially evident from FIGS. 2 to 4, the description of which now follows.

The hold-down 30 comprises a press-on belt 33, preferably a toothed belt, revolving over two pulleys 32, 34, the lower section of the belt rolling in travel direction on the overlapping sheet edges R1, R2. To support the pulleys 32 and 34, there is used one long sideplate 35 and one short sideplate 36, which plates are joined together over a central web 37, e.g. by screwing or riveting. An axle 38, on which the pulley 34 rotates loosely, is guided in horizontal slots 40 in the sideplates 35 and 36 and retained by clamping screws 39. The proper tension of belt 33 can be adjusted by means of the screws 39. At the other end of the long sideplate 35, a bearing sleeve 44 is firmly inserted, on which the pulley 32 is mounted through a ball bearing 46. Under the central web 37, is a pressure shoe 41 which by the action of compression springs 43, loads the lower section of belt 33, the position of shoe 41 being adjustable by means of screws 42.

The hold-down 30 of the described construction rests essentially by its own weight with the lower section of belt 33 on the overlapping sheet edges. It is moved along in travel direction by shaft 16 guided by the bearing sleeve 44. Next to the press-on roller 20, the hold-down 30 is retained laterally between the fixed bearings 18 of shaft 16, so that (unlike roller 20) a certain vertical play remains. This is achieved by bearing sleeve 44 having a vertical slot 45, whereby the sleeve is guided at shaft 16 to be movable in vertical direction. The press-on belt 33 or its pulley 32 is, futhermore, in drive connection with the press-on roller 20: Two tappets 47 protruding laterally from pulley 32 engage in corresponding lateral bores 48 at the press-on roller 20, and this, with sufficient clearance, allowing certain relative movements between roller 20 and pulley 32 in a radial direction as well as in the direction of rotation. Preferably the driven pulley 32 is somewhat larger (e.g. by one half the belt thickness) than roller 20, as can be seen in particular from FIG. 2. Roller 20 and pulley 32 have the belt 33 rest permanently flush on sheet F1 at the bottom, whereby a slight vertical displacement occurs between the axle of roller 20 and the axle of pulley 32. In this arrangement, the upper section of belt 33 is driven by pulley 32 slightly "leading", thereby creating the tendency that the pulley 34 leading in the travel direction is lightly pressed downward (arrow Q in FIG. 3). Altogether, this produces a permanent flush application of the lower belt section during advance of the welding machine, whereby the lateral closure of pocket T is preserved even when passing over uneven surfaces. The lower section of the press-on belt, transmitting the press-on force, however, rolls along on sheet, F1 entirely without slip exactly at the speed of travel of the machine frame.

The above-mentioned L-shaped form of the machine frame 1 has the further advantage that any aggressive fumes that may form in the weld zone can freely issue and evaporate. In addition, the area of the pocket T and the correct position of the press-on roll 20 relative to the sheet edge B can be readily observed.

While the foregoing description and drawings represent the preferred embodiments of the present invention, it will be obvious to those skilled in the art that various changes and modifications may be made therein without departing from the true spirit and scope of the present invention.

What is claimed is:

1. A large-area welding machine for plastic sheets laid out with overlapping edges, having a machine frame wheelable on rollers in the direction of the sheet edges, a heating nozzle running along and engaging between the sheet edges in front of a press-on roller mounted on a driver shaft, as well as hold-down means disposed next to the heating nozzle and pressing the sheet edges together, the improvement comprising: means for synchronously driving the press-on roller and two travel rollers in a direction of travel, means for mounting the travel rollers laterally offset from the press-on roller, and hold-down means with a press-on belt rotating in the direction of travel and rolling on the sheet edges, said hold down means being mounted on said machine frame next to said press-on roller with vertical play guided at the drive shaft of the press-on roller by a vertical slot.

2. A welding machine according to claim 1, wherein said press-on belt is guided over two pulleys and is in driven connection with said press-on roller.

3. A large-area welding machine for plastic sheets laid out with overlapping edges, having a machine frame wheelable on rollers in the direction of the sheet edges, a heating nozzle running along and engaging between the sheet edges in front of a press-on roller, as well as hold-down means disposed next to the heating nozzle and pressing the sheet edges together, the improvement comprising: means for synchronously driving the press-on roller and two travel rollers in a direction of travel, means for mounting the travel rollers laterally offset from the press-on roller, and hold-down means with a press-on belt rotating in the direction of travel and rolling on the sheet edges; wherein said press-on belt is guided over two pulleys and is in driven connection with said press-on roller and wherein tappets are provided to interengage with play one of said pulleys with the press-on roller.

4. A welding machine according to claim 3, wherein said one pulley is a driven pulley which is somewhat larger than the press-on roller.

* * * * *